United States Patent
Brenneke

(10) Patent No.: US 6,725,756 B2
(45) Date of Patent: Apr. 27, 2004

(54) TWO-PIECE METAL PUNCH CONSTRUCTION

(75) Inventor: Doug Brenneke, Yoder, IN (US)

(73) Assignee: L.H. Carbide Corporation, Fort Wayne, IN (US)

( * ) Notice: Subject to any disclaimer, the term of this patent is extended or adjusted under 35 U.S.C. 154(b) by 137 days.

(21) Appl. No.: 09/999,897

(22) Filed: Oct. 23, 2001

(65) Prior Publication Data

US 2003/0075034 A1 Apr. 24, 2003

(51) Int. Cl.[7] .................................................. B26F 1/14
(52) U.S. Cl. .................... 83/697; 83/698.11; 83/698.71; 83/698.91
(58) Field of Search .................. 83/698.71, 698.11, 83/697, 698.91; 403/267, 265, 266

(56) References Cited

U.S. PATENT DOCUMENTS

| | | | | |
|---|---|---|---|---|
| 3,974,728 A | * | 8/1976 | Herlan ........................ 83/686 |
| 4,793,231 A | * | 12/1988 | Brown ........................ 83/684 |
| 5,028,162 A | * | 7/1991 | Tsuno et al. ................... 403/30 |
| 5,141,353 A | * | 8/1992 | Meredith et al. ............ 403/267 |
| 5,146,832 A | * | 9/1992 | Wilson et al. ........... 83/698.91 |
| 5,746,104 A | * | 5/1998 | Russell et al. ........... 83/698.71 |
| 5,921,599 A | * | 7/1999 | Sun .............................. 294/57 |

* cited by examiner

Primary Examiner—Allan N. Shoap
Assistant Examiner—John Windmuller
(74) Attorney, Agent, or Firm—Baker & Daniels

(57) ABSTRACT

An apparatus for providing an improved two-piece punch construction. The two-piece punch construction includes a supporting member and a punch body. The supporting member includes an aperture in which the punch body is accurately located. The supporting member further includes a supporting surface for supporting the punch body during a punching operation. The punch is constructed by providing at least one through-hole in the supporting member which receives a WEDM wire. The aperture for locating the punch body in the supporting member is made with a WEDM process. The supporting member and punch body are secured together by brazing material.

8 Claims, 3 Drawing Sheets

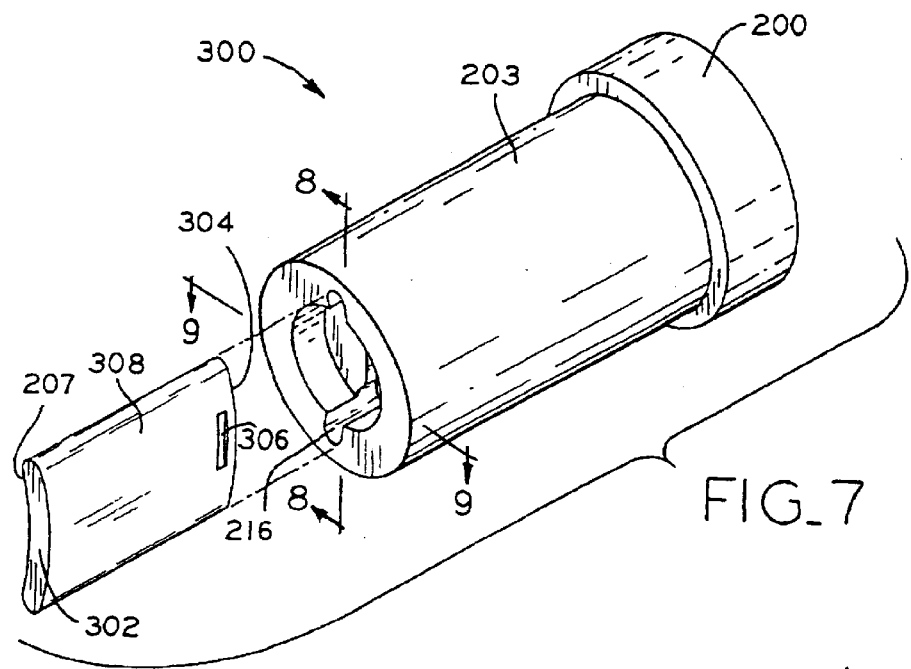
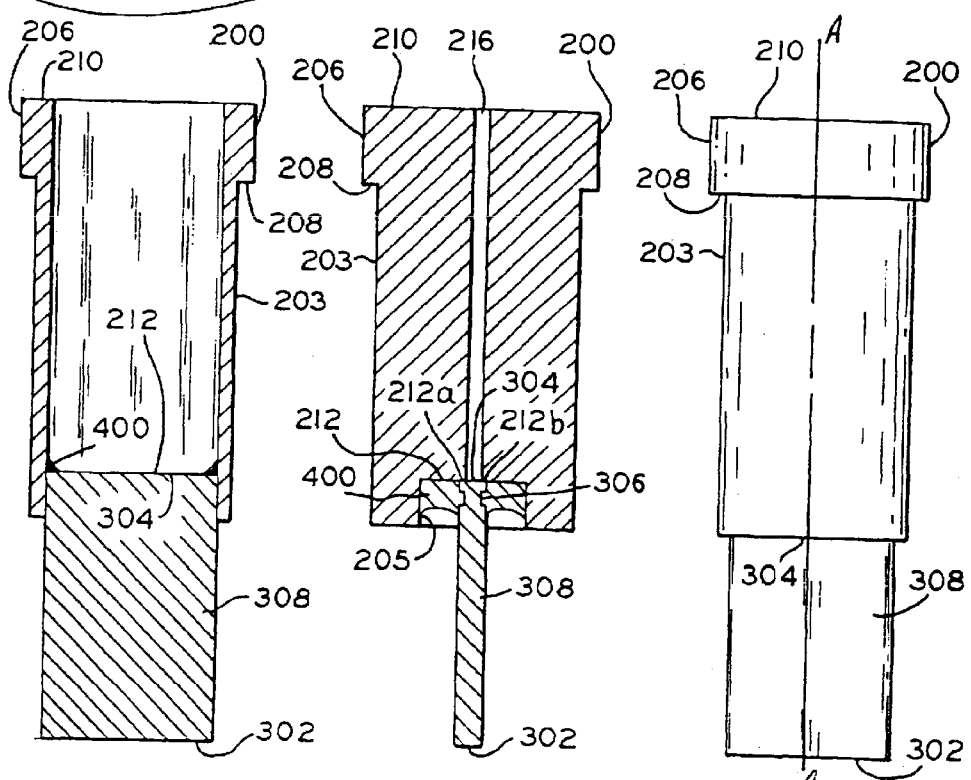

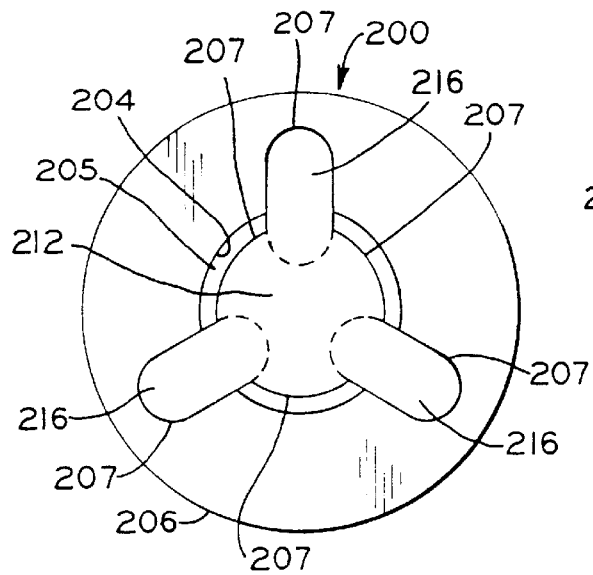
FIG_11
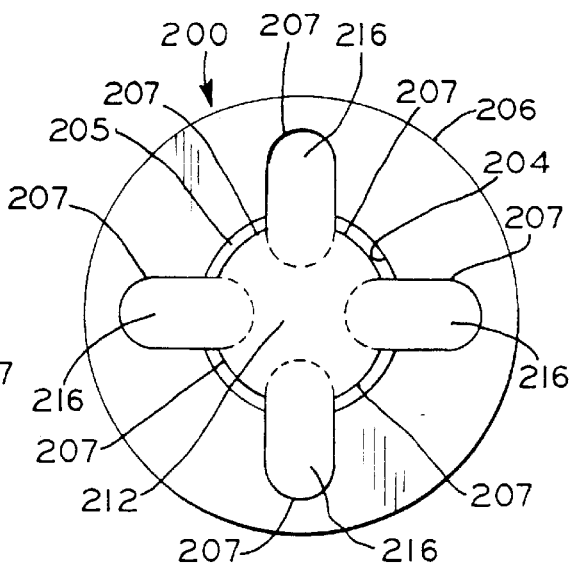
FIG_12
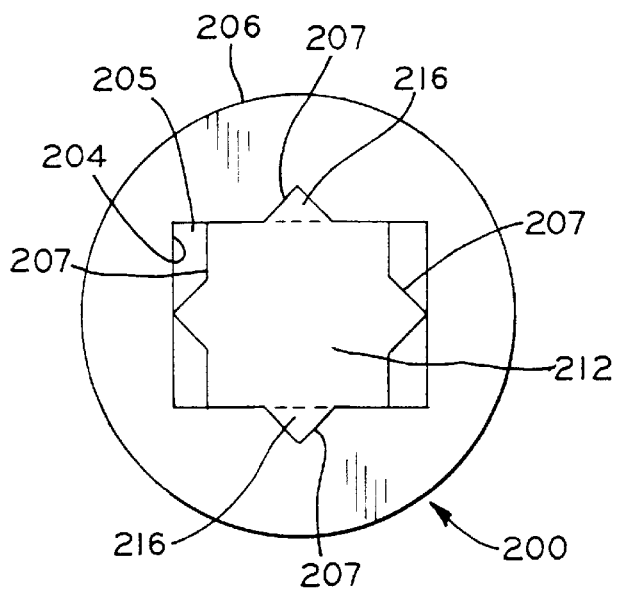
FIG_13
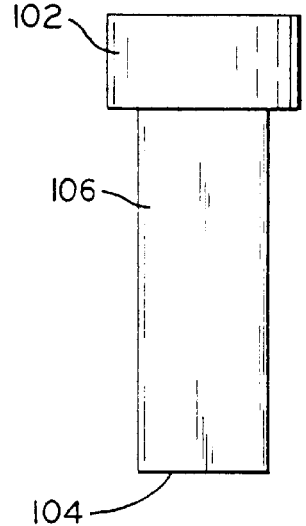
FIG_14

TWO-PIECE METAL PUNCH CONSTRUCTION

BACKGROUND OF THE INVENTION

1. Field of the Invention

The present invention relates to the construction of a metal punch, and, more particularly, to the construction of a two-piece metal punch.

2. Description of the Related Art

A metal punch is traditionally made as a one-piece construction. The one-piece construction is typically made of a single piece of carbide. The punch is produced from a carbide preform whereby the rough shape of the punch is established in a pre-sintered state. The head, thickness dimensions, shank diameter (if of a shanked design), and the punch contour are finish ground. This method of creating a one-piece punch, however, is expensive and time-consuming. While this structure has the advantages of rigidity and strength, the material and labor necessary to produce a one-piece carbide punch cause such punches to be expensive.

A two-piece punch construction is an alternative to a one-piece construction. A common two-piece punch construction, however, only overcomes one problematic aspect of a one-piece construction. The common two-piece punch construction, while less time-consuming and expensive to make, is not as strong and rigid as the one-piece punch construction. In a two-piece punch construction, the punch body is made in the form of a "stick" by using wire electrical discharge machining (WEDM) of a rectangular stock block of carbide. Alternatively, the punch body is made by the grinding of a headless carbide preform. The head is made of steel. The cross-sectional shape of the punch body may be WEDM-cut through the head. The head and punch body are joined by fillet brazing. This construction, however, raises problems. First, the two materials will often separate because the punch head is not supported by a perfectly flush substrate. Frequently, the punch head is supported by a setscrew the lower surface of which is cup-shaped. Even when the lower surface of the setscrew is ground flat, the setscrew may not provide even contact with the punch head. If the setscrew, or other support, comes in contact with the steel head but not the carbide portion of the punch, the impact of the punching operation will tend to shear the braze and separate the head and the punch body.

What is needed is a punch construction which provides the strength and rigidity of the one-piece punch construction without the cost and time problems associated therewith. What is further needed is a punch construction which provides the cost and time benefits of the common two-piece punch construction without the loss of strength and rigidity.

SUMMARY OF THE INVENTION

The present invention provides a two-piece punch construction which maintains the integrity of a one-piece punch construction while providing the cost and time advantages of a two-piece punch construction.

The present invention, in one form thereof, comprises a two-piece punch construction including a head (or head and shank combination) and a punch body. The head or head and shank combination hold the punch body and include an aperture in which the punch body is accurately located. The head or shank includes a supporting surface for the punch body. The head or head and shank are manufactured with at least one through-hole which is operable to receive a wire used in a WEDM process. The WEDM process creates the accurate aperture in the head in which the punch body is located.

An advantage of the present invention is that the punch according to the invention is less expensive than prior art punches.

Another advantage of the present invention is that the two-piece punch according to the invention is as strong and rigid as a prior art punch constructed of a single piece of material.

Yet another advantage of the present invention is that the two-piece punch according to the invention is considerably stronger than prior art two-piece punch constructions.

A still further advantage of the present invention is the reduction of production time to produce a punch according to the invention.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 7 is an exploded view of a two-piece shanked punch according to the present invention.

FIG. 8 is a cross-sectional view of the punch of FIG. 7 taken along line 8—8.

FIG. 9 is a cross-sectional view of the punch of FIG. 7 taken along line 9—9.

FIG. 10 is a side view of a two-piece shanked punch according to the present invention.

FIG. 11 is a top view of a head with three apertures after WEDM according to an alternative embodiment of the present invention.

FIG. 12 is a top view of a head with four apertures after WEDM according to an alternative embodiment of the present invention.

FIG. 13 is a top view of a head with two apertures after WEDM according to an alternative embodiment of the present invention.

FIG. 14 is an elevational view of a shankless punch according to the present invention.

Corresponding reference characters indicate corresponding parts throughout the several views. The exemplifications set out herein illustrate preferred embodiments of the invention, in one form, and such exemplifications are not to be construed as limiting the scope of the invention in any manner.

DETAILED DESCRIPTION OF THE INVENTION

Figure 1:
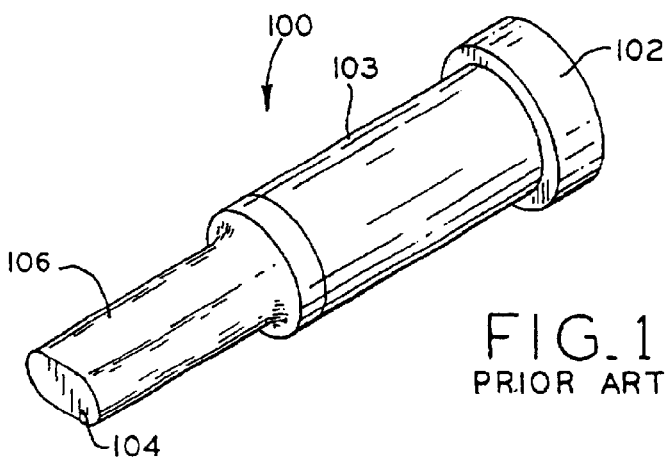
FIG. 1 is a prior art one-piece shanked punch construction.

Referring now to the drawings and particularly to FIG. 1, there is shown a prior art one-piece shanked punch con struction. One-piece punch 100 is traditionally made of a single piece of carbide. Punch 100 is produced from a carbide preform which provides the rough shape of punch 100 in a pre-sintered state. Punch 100 is then finish ground. The grinding process defines head 102, shank 103, punch body 106, and punch surface 104. Head 102 represents the part of the punch which is held by the upper die (punch) assembly in a press. Punch surface 104 provides the punch surface which contacts the sheet metal or other material to be punched in a punching operation. The materials and labor associated with the production of punch 100 are expensive. Furthermore, the process to manufacture punch 100 is time consuming and may take up to forty-five days, including delivery time of the carbide preform from the carbide manufacturer.

In accordance with the present invention, FIG. 7 illustrates an unassembled exploded view of a two-piece shanked punch construction. Two-piece punch 300 includes punch body 308, head 200 and shank 203. Punch body 308 may have any shape which will accommodate specific manufacturing capabilities and design requirements. Punch body 308 is operable to be accurately and securely placed into shank 203, and, more specifically, into aperture 216. Punch body 308 must be inserted into aperture 216 with a close fit, e.g., a line fit, whereby punch body 308 cannot move laterally. Punch body 308 includes punch surface 302 which provides the working surface of the punch and which contacts the sheet metal or other material to be punched in a punching operation. Punch surface 302 also defines a transverse cross-section for punch body 308. Punch body 308 may have a uniform cross-section throughout the length of punch body 308. The cross-section is shown as "kidney" shaped. Punch body 308, however, could be contoured at the end which is inserted into aperture 216 to better locate punch body 308 in shank 203 in certain applications. Punch body 308 further includes bottom surface 304 which provides a surface to contact a portion of shank 203 to be described in detail below. Recess 306 is provided in the side of punch body 308 to promote better locking of punch 300 in head 200. Such a locking element 306 could also be a notch, a projection, or any other suitable configuration which is advantageous to particular manufacturing capabilities and design requirements.

Punches can be manufactured with a shanked construction, to include a head 200, shank 203 and a punch body 308. Alternatively, the shankless punch could be constructed to have a head 200 and a punch body 308. FIG. 7 illustrates a shanked construction of a punch 300. By contrast FIG. 2 illustrates a head for a shankless punch.

Figure 2:
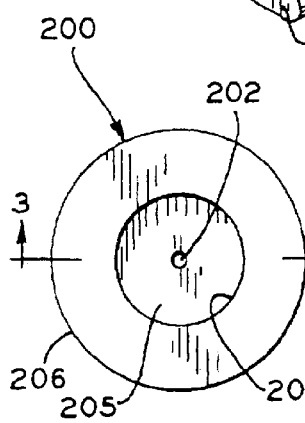
FIG. 2 is a bottom view of a punch head before WEDM according to the present invention.

In the configuration of FIGS. 2 and 7 the head is shown as cylindrical in shape. Alternative shapes of heads could also be used.

In order to provide an aperture 216 as shown in FIG. 7, a WEDM process may be used to manufacture the very accurate aperture 216 as further explained hereinbelow. While WEDM is a preferred method for providing aperture 216, it is possible that other methods of removing metal to make the very accurate aperture 216 could also be used.

FIG. 2 illustrates a top view (i.e., looking from surface 104 toward the head) of head 200 of a shankless punch before WEDM. Head 200 may be made of steel or any other suitable material which is strong, easily manufactured, and inexpensive. Head 200 must be able to hold punch body 308 as well as be suitable to be held by the upper die (punch) assembly used in a punching operation. Head 200 must be large enough in diameter to more than circumscribe punch body 308. Head 200 must include a through-hole 202 to accommodate a WEDM wire. Counterbore 205 in head 200 has an outer peripheral surface 204 defining the perimeter of counterbore 205. Counterbore 205 further defines supporting surface 212. Supporting surface 212 must be present in head 200 for adequately supporting punch body 308. Counterbore 205 is formed using any suitable method including turning, milling, EDM, drilling, and broaching and must be large enough to provide an adequate supporting surface 212 for punch body 308. Counterbore 205 need not be as accurate as aperture 216 since the WEDM process accurately locates the punch. Head 200 includes outer surface 206 which defines the outside perimeter of head 200.

Figures 3, 4:
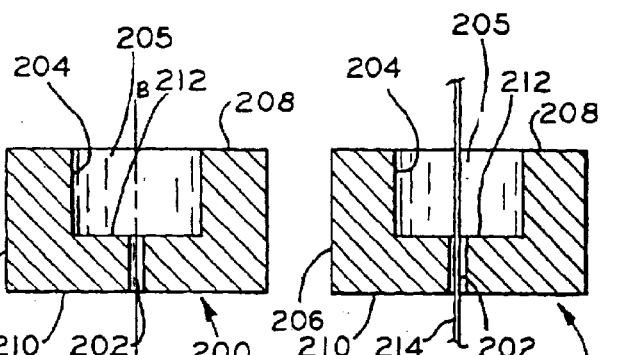
FIG. 3 is a cross-sectional view of the head taken along line 3—3 of FIG. 2.
FIG. 4 is a cross-sectional view of the head of FIG. 2 during WEDM.

FIG. 3 illustrates a cross-sectional view of head 200 before WEDM taken along line 3—3 of FIG. 2. Head 200 includes outer surface 206, bottom surface 208, and top surface 210 thereby defining the outside dimensions of head 200. Through-hole 202 is provided in head 200 to provide a location for WEDM wire 214. Counterbore 205 provides for supporting surface 212 which is operable to support punch body 308 during a punching operation.

FIG. 4 illustrates a cross-sectional view of head 200 during WEDM taken along line 3—3 of FIG. 2 with WEDM wire 214 located in through-hole 202. WEDM wire 214 extends through through-hole 202. The WEDM process allows for the machining of apertures of any shape or variety that will accommodate manufacturing capabilities and design requirements.

Figure 5:
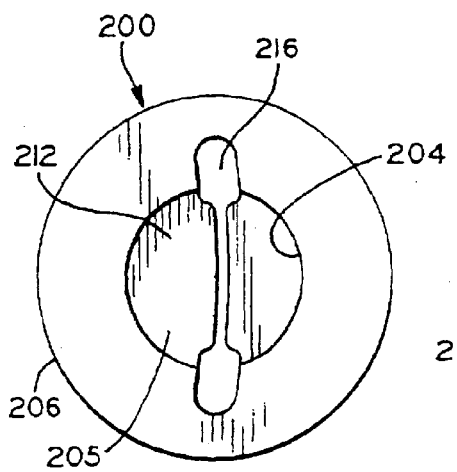
FIG. 5 is a top view of the head after WEDM according to the present invention.

FIG. 5 illustrates a top view of head 200 after WEDM (i.e., as seen from the end of the punch at which surface 302 is located). WEDM wire 214 provides machined aperture 216 which very accurately locates punch body 308. Aperture 216 extends through head 200 and forms a close fit, e.g., a line fit, with punch body 308. Aperture 216 includes axis A—A, as shown in FIG. 10, in the direction of the movement of punch 300 during a punching operation. Longitudinal axis B—B, as shown in FIG. 3, of through-hole 202 is coaxial with axis A—A.

Figure 6:
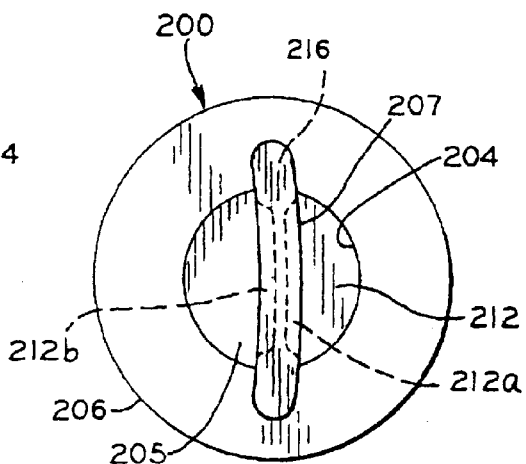
FIG. 6 is a top view of the punch of FIG. 7.

FIG. 6 illustrates a top view of punch 300 as seen from the end at which surface 302 is located. The supporting surface for punch body 308 is defined by supporting surface 212. Supporting surface 212 must be adequate to fully support punch body 308 during a punching operation without any negative effects on the punch. Support surfaces 212a and 212b of supporting surface 212 are shown in dashed lines. Surfaces 212a and 212b provide the necessary support for punch body 308 and are defined by punch body 308 and supporting surface 212. Aperture 216 is partially drawn in dashed lines, while punch outline 207 is shown in solid lines. As indicated in this embodiment, counterbore 205 need not be accurately machined and provides a location for a suitable securing material, such as brazing material, to retain punch body 308.

FIG. 8 illustrates a cross-sectional view of shanked punch 300 taken along line 8—8 in FIG. 7. Punch body 308 is located in aperture 216 in head 200. Punch body 308 is secured in head 200 with securing material 400. Securing material 400 secures and retains punch body 308 in head 200. Suitable securing material 400 may include brazing material, silver solder, adhesive, epoxy, weld, or any other suitable material.

FIG. 9 illustrates a cross-sectional view of punch 300 taken along line 9—9 in FIG. 7. Punch body 308 is located in aperture 216 and is supported by supporting surface 212. Punch bottom surface 304 is at least partially flush with supporting surface 212, thereby providing a flush substrate to support punch body 308 during a punching operation. Element 306 is operable to lock punch body 308 in head 200. In operation, recess 306 aids securing material 400 to facilitate the holding of punch body 308 in head 200. Element 306 could be any device which aids in the rigid maintenance of punch body 308 in head 200, such as a recess, notch, projection and the like.

FIG. 10 illustrates a side view of punch 300. Punch body 308 is located in head 200 with punch surface 302 operable to perform a punching operation.

There are an infinite number of ways to position WEDM apertures 216 to make an infinite number of punch shapes. The location of apertures 216 and number of punch shapes are able to suit any shape or variety that is necessary to accommodate manufacturing capabilities and design requirements. FIG. 11, FIG. 12, and FIG. 13 provide three examples of the alternate ways to position apertures 216 and shape punch body 308.

FIG. 11 is an alternative embodiment of the present invention and shows a top view of head 200 after WEDM, i.e., as seen from the side into which a punch is inserted. Head 200 contains three apertures 216 formed with WEDM. The outline for a punch body 308 is shown by solid line 207. Counterbore 205 provides a location for securing material 400. Apertures 216 extend through head 200 and accurately locate a punch body 308. Supporting surface 212 is defined by the dashed-line portions of apertures 216 and circular portion of outline 207. Supporting surface 212 provides a support for a surface 304 of a punch body 308 during a punching operation.

FIG. 12 is an alternative embodiment of the present invention and shows a top view of head 200 after WEDM, i.e., as seen from the side into which a punch is inserted. Head 200 contains four apertures 216 formed with WEDM with punch outline 207. Counterbore 205 provides a location for securing material 400. Apertures 216 extend through head 200 and accurately locate punch body 308. Supporting surface 212 is defined by the dashed portions of apertures 216 and circular portion of outline 207. Supporting surface 212 provides a support for surface 304 of punch body 308 to surface against during a punching operation.

FIG. 13 is an alternative embodiment of the present invention and shows a bottom view of head 200 after WEDM, i.e., as seen from the side into which a punch is inserted. Head 200 contains two apertures 216 formed by WEDM with punch outline 207. Counterbore 205 provides a location for securing material 400. Apertures 216 extend through head 200 and accurately locate punch body 308. Supporting surface 212 is defined by the dashed portions of apertures 216 and portions of outline 207 within counterbore 205. Supporting surface 212 provides a support for surface 304 of punch body 308 to surface against during a punching operation.

FIG. 14 shows a shankless punch according to the present invention with a punch 106 and a head 102.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A punch for use with metal material, said punch comprising;

a carbide punch body;

a unitary member for holding said punch body, said member including an aperture in which said punch body is located, said aperture including a central aperture axis oriented in the direction of the movement of said punch during a punching operation, said aperture including a bottom surface defining a supporting surface for supporting said punch body, said aperture including a peripheral surface, said peripheral surface having an innermost portion and an outermost portion further from said central aperture axis than said innermost portion, wherein said punch body forms a close fit with only said outermost portion of said peripheral surface at least one through-hole in said member, said through-hole smaller in cross sectional area than said aperture and having a longitudinal axis which is coaxial with said central aperture axis, said punch body secured in said member by a securing material selected from the group consisting of braising material, silver solder, adhesive epoxy, and welding material, said securing material contacting said innermost portion said peripheral surface and not contacting said outermost portion.

2. The punch according to claim 1 wherein said member comprises a head.

3. The punch according to claim 1 wherein said member comprises a shank, said punch further including a head connected to said shank.

4. The punch according to claim 1 wherein said member is made of steel.

5. The punch according to claim 1 wherein said aperture comprises a counterbore for accommodating said punch body, said counterbore defining said supporting surface.

6. The punch according to claim 5 wherein said counterbore receives said securing said material for securing said punch body in said member.

7. The punch according to claim 1 wherein a transverse cross-section of said punch body is uniform throughout the length of said punch body.

8. The punch according to claim 1 wherein said punch body includes a locking mechanism to lock said punch body in said member.

* * * * *